United States Patent [19]

Mueller et al.

[11] Patent Number: 5,096,779
[45] Date of Patent: Mar. 17, 1992

[54] CHROMIUM DIOXIDE MATERIAL, ITS PREPARATION AND MAGNETIC RECORDING MEDIA CONTAINING THIS CHROMIUM DIOXIDE MATERIAL

[75] Inventors: Michael W. Mueller, Plankstadt; Ekkehard Schwab, Neustadt; Helmut Auweter, Limburgerhof; Rainer Feser, Gruenstadt; Werner Huebner, Frankenthal; Norbert Mueller, Friedelsheim; Manfred Ohlinger, Frankenthal; Hermann Dikow, Hockenheim, all of Fed. Rep. of Germany

[73] Assignee: BASF Aktiengesellschaft, Ludwigshafen, Fed. Rep. of Germany

[21] Appl. No.: 397,290

[22] Filed: Aug. 23, 1989

[51] Int. Cl.$^5$ .............................................. G11B 23/00
[52] U.S. Cl. ..................................... 428/403; 428/694; 428/900; 427/372.2; 427/430.1
[58] Field of Search ............... 428/402, 403, 404, 694, 428/900; 23/293 R; 427/212, 372.1, 430.1

[56] References Cited

U.S. PATENT DOCUMENTS

| 2,956,955 | 10/1960 | Authur | 252/62.5 |
| 3,117,093 | 10/1960 | Arthur et al. | 252/62.5 |
| 3,278,263 | 11/1964 | Cox | 23/145 |
| 3,512,930 | 5/1970 | Bottier et al. | 23/145 |
| 3,686,031 | 8/1972 | Balthis et al. | 252/62.51 |
| 3,687,726 | 8/1972 | Pye et al. | 428/404 |
| 3,767,580 | 10/1973 | Kitamoto et al. | 252/62.51 |
| 4,495,246 | 1/1985 | Steck et al. | 428/403 |

FOREIGN PATENT DOCUMENTS

| 0248402 | 12/1981 | European Pat. Off. |
| 0029687 | 8/1983 | European Pat. Off. |
| 0078042 | 4/1985 | European Pat. Off. |
| 1241773 | 8/1971 | United Kingdom |

Primary Examiner—Paul J. Thibodeau
Attorney, Agent, or Firm—Keil & Weinkauf

[57] ABSTRACT

A chromium dioxide material consisting of acicular, ferromagnetic chromium dioxide particles having a nonmagnetic, hydrogen-containing protective surface layer, which material has improved stability to chemical decomposition, a process for its preparation and magnetic recording media containing this chromium dioxide and having good long-term stability of the residual magnetization under conditions of high humidity and temperature are described.

3 Claims, No Drawings

CHROMIUM DIOXIDE MATERIAL, ITS PREPARATION AND MAGNETIC RECORDING MEDIA CONTAINING THIS CHROMIUM DIOXIDE MATERIAL

The present invention relates to a chromium dioxide material having improved stability to chemical decomposition and to a deterioration in the magnetic properties, in particular as a result of exposure to heat and moisture, a process for its preparation by a two-stage surface treatment, and magnetic recording media having greater long-term stability and containing this chromium dioxide material.

Acicular, ferromagnetic chromium dioxide, its preparation and the use of this material for magnetic recording media have been described in many publications. Magnetic recording media which contain chromium dioxide generally have superior magnetic properties compared with recording media based on other magnetic oxides.

However, it is also known that the magnetic properties of recording media containing nonstabilized chromium dioxide deteriorate in the course of time. Ferromagnetic chromium dioxide in powder form is substantially stable in the absence of moisture and there is furthermore no detectable change in the magnetic properties over a prolonged period. However, it has been observed that chromium dioxide can be attacked both by water and by other materials, for example the organic polymer binders used in the preparation of magnetic recording media, with decomposition to nonmagnetic components. In the case of magnetic recording media, this means not only a loss of the magnetic and hence electroacoustic properties but also an adverse effect on the mechanical properties. This deterioration is further accelerated at elevated temperatures. There has therefore been no lack of attempts to overcome these disadvantages. For example, U.S. Pat. No. 3 512 930 describes the treatment of chromium dioxide powder with a reducing agent. In other processes, aluminum oxide coatings (U.S. Pat. No. 3 687 726) or coatings of sparingly soluble metal phosphates (U.S. 3 686 031) are produced. The application of metal compounds whose cations are capable of forming sparingly soluble chromates has also been disclosed (DE-B 21 52 331). JA-A-21200/76 proposes applying magnetic iron oxides to the surface in order to coat the chromium dioxide particles, while DE-A-27 49 757 describes the application of iron-(III)-containing oxidic precipitates to the chromium dioxide. EP-B 0078042 describes a stabilization process in which metals, for example iron, zinc, cobalt or manganese are incorporated in the surface of the chromium dioxide particles. Attempts have also been made to increase the stability merely by thermal treatment of the chromium dioxide under an inert gas atmosphere (EP-B 0029687) or in the air (EP-B 0248402).

However, all these processes have the disadvantage that the magnetic properties of the treated chromium dioxide materials are greatly reduced by a non-magnetic surface layer which is obtained either by coating with foreign compounds or by means of a decomposition layer, and the recording media produced using the chromium dioxide materials obtained by these processes still do not possess, to an adequate extent, the long-term stability now required particularly in the data sector. Extensive investigations have shown that the instability of the chromium dioxide material in a magnetic layer is due predominantly to the humidity of the surrounding air, particularly at relatively high temperatures. As a result of attack by the atmospheric humidity, the chromium dioxide is cleaved to give a chromium(III) oxide-containing compound and chromate ions in a reaction which is the reverse of the reaction for its preparation, the said chromate ions oxidizing the organic components of the magnetic layer. Thus, the stability of the chromium dioxide in the magnetic layer is scarcely affected at 0% relative humidity; it is not until a high relative humidity of, for example, 95% is reached that the stability decreases, even in the case of stabilized chromium dioxide. This shows that, although stabilization of the chromium dioxide according to the prior art improves the chromium dioxide, the stabilization is not sufficient under unfavorable conditions to prevent the influence of the water vapor.

It is an object of the present invention to provide a chromium dioxide material which has decisively improved stability to chemical decomposition due to moisture, without any significant deterioration in the magnetic properties, in particular the saturation magnetization, and a process for the preparation of this material. It is a further object of the present invention to provide magnetic recording media having the greater long-term stability required in particular for data storage.

We have found that these objects are achieved by a chromium dioxide material consisting of acicular, ferromagnetic chromium dioxide particles having a non-magnetic, hydrogen-containing protective surface layer, if the chromium dioxide material has a saturation magnetization greater than 80 $nTm^3/g$ and a Z 200 value of less than 0.85 ppm.

The Z 200 value according to the invention provides information about the stability of the chromium dioxide to the chemical decomposition of the material due to moisture and temperature influences, i.e. the disproportionation of the chromium(IV) into chromium(III) and chromium(VI). The Z 200 value is determined by milling 92 g of chromium dioxide in 1,720 ml of water in a glass vessel for 200 hours at room temperature on a roller stand (rotation speed 80 rpm). Thereafter, the suspension is filtered and the chromate content of the filtrate is determined. This gives the Z 200 value, stated in ppm of $CrO_3$ (mg of $CrO_3/l$).

To prepare the novel chromium dioxide material, the product synthesized by the known processes is used as the starting material. For example, U.S. Pat. Nos. 2,956,955, 3,117,093 and 3,278,263 and European Patents 27,640 and 198,110 describe the preparation of chromium dioxide which, with the aid of special modifiers based on antimony, selenium, tellurium and/or iron or their compounds, have particularly advantageous magnetic properties and a narrow particle size distribution.

To carry out the novel process, the chromium dioxide material formed in the high pressure synthesis and still untreated is first heated at from 360° to 420° C. for from 10 to 360 minutes, then suspended in from 5 to 15 parts by weight of water per part by weight of chromium dioxide, mixed with an aqueous solution of from 0.2 to 0.4 part by weight of sodium sulfite and treated at from 60° to 95° C. for not more than 180 minutes. The chromium dioxide material is then filtered off, washed and dried.

The novel chromium dioxide material obtained in this manner has exceptional stability to the disproportionation initiated by water, without however experiencing a deterioration in the magnetic properties to the extent known from the prior art, i.e. the saturation magnetization is always more than 80 nTm$^3$/g. The novel chromium dioxide materials thus have a particularly effective protective surface layer which is especially advantageous since it is produced without the aid of foreign metal components, whether by application of a precipitate or by incorporation in the surface region of the chromium dioxide particles.

The synergistic action of the two successive stabilization steps is surprising since the individual measures are much less effective.

The novel chromium dioxide is processed to magnetic recording media by a known method. For the preparation of the magnetic layer, from 2 to 10 parts by weight of chromium dioxide per part by weight of binder are processed, together with the binder and the suitable dispersants, lubricants and other conventional additives in a total amount of not more than 10% by weight, based on the chromium dioxide, to give a dispersion. The dispersion thus obtained is filtered and is applied to the nonmagnetic substrate in one or more thin layers, or in a thin layer to a magnetic recording medium already provided with another magnetic layer, using a conventional coating apparatus, for example by means of a knife coater. Before the liquid coating mixture is dried at from 50° C. to 90° C., the chromium dioxide particles may be magnetically oriented. For a special surface treatment of the magnetic layer, the coated film webs are passed between heated, polished rollers under pressure. Thereafter, the thicknesses of the magnetic layers are usually from 1.5 to 12 μm.

The binders used for the magnetic layers are the known polymer binders, such as acrylate copolymers, polyvinyl acetates, such as polyvinylformal or polyvinylbutyral, relatively high molecular weight epoxy resins, polyurethanes and mixtures of these and similar binders. The elastomeric linear polyesterurethanes which are soluble in a volatile organic solvent and virtually free of isocyanate groups, as can be prepared by reacting a polyester of an aliphatic dicarboxylic acid of 4 to 6 carbon atoms, such as adipic acid, and one or more aliphatic diols of 3 to 10 carbon atoms, such as 1,2- and 1,3-propylene glycol, butane-1,4-diol, diethylene glycol, neopentylglycol or octane-1,8-diol, with a diisocyanate of 6 to 24, in particular 8 to 20, carbon atoms, such as toluylene diisocyanate or 4,4'-diisocyanatodiphenylmethane, preferably in the presence of a smaller amount of a glycol of 4 to 10 carbon atoms, such as butane-1,4-diol, which effects chain extension, have proven advantageous. Polyesterurethanes obtained from adipic acid, butane-1,4-diol and 4,4'-diisocyanatodiphenylmethane are preferred. Preferred polyesterurethanes have a Shore A hardness of from 70 to 100, a tensile strength of from 40 to 42 N/mm$^2$ (according to DIN 53,455) and an elongation at break (according to DIN 53,455) of about 440-560%. The K value according to H. Fikentscher (Cellulose-Chemie 13 (1932), 58 et seq.) is from 40 to 60 for the particularly suitable polymer binders (1% strength in dimethylformamide).

Magnetic recording media which have been produced using the novel chromium dioxide material have a residual magnetization of the magnetic layer of not less than 145, preferably from 145 to 220, in particular from 150 to 180, mT, which decreases by less than 1.5%, even in the environmental test. This stability under extreme temperature and humidity conditions is determined by storing a magnetic recording medium at 50° C. and 70% relative humidity for 14 days and then measuring the residual magnetization at room temperature. The residual magnetization ($M_r(14)$) measured after the environmental test, and the decrease in the residual magnetization in percent, based on the initial value, are stated. The residual magnetization $M_r$ in [mT] is determined using a vibrating sample magnetometer in a magnetic field of 380 kA/m.

The Examples which follow illustrate the invention in comparison with the Comparative Experiments according to the prior art. In the Examples and Comparative Experiments which follow, parts and percentages are by weight, unless stated otherwise. Parts by volume bear the same relation to parts by weight as that of the liter to the kilogram.

EXAMPLE 1

A CrO$_2$ prepared according to Example 1 of EP-A 0198110 and whose amount of dopant corresponds to that of Example 1 of EP-A 0027640 was dried in the air, but without aftertreatment with Na$_2$SO$_3$ or iron sulfate at 50° C. Thereafter, the material was subjected to a heat treatment under air at 380° C. for 60 minutes and then suspended in a ratio of 1:10, in a 25% strength sodium sulfite solution in water at 95° C. and, after 180 minutes, filtered off, washed with water and dried at 50° C. under reduced pressure.

For the resulting chromium dioxide, the specific surface area BET in [m$^2$/g] according to DIN 66,132 was determined using a Ströhlein areameter from Ströhlein, Düsseldorf, by the single-point difference method of Haul and Dümbgen, and the magnetic properties were determined by means of a vibrating sample magnetometer in a magnetic field of 380 kA/m, i.e. the coercive force $H_c$ in [kA/m] and the specific remanence $M_r/\rho$ and the saturation magnetization $M_m/\rho$ in [nTm$^3$/g]. The hydrogen content of the material was also determined by combustion of the substance at 1000° C. followed by determination of the resulting water by infrared spectroscopy, and the Z 200 value was determined as described.

The results of the measurements are shown in Table 1.

EXAMPLES 2 TO 5

The procedure described in Example 1 was followed, except that the various parameters shown in Table 1 were used.

The results of the measurements are shown in Table 1.

COMPARATIVE EXPERIMENTS 1 TO 6

The procedure described in Example 1 was followed, except that the various parameters shown in Table 1 were used.

The results of the measurements are shown in Table 1.

TABLE 1

| | Heating temp. [°C.] | Heating time [min] | Stab. conditions | $H_c$ [kA/m] | $M_m/\rho$ [nTm³/g] | $M_r/\rho$ [nTm³/g] | BET [m²/g] | H content [% by wt.] | Z 200 value [ppm] |
|---|---|---|---|---|---|---|---|---|---|
| Example 1 | 380 | 60 | 25% Na₂SO₃ 180', 95° C. | 39 | 91 | 38 | 25 | 0.3 | 0.8 |
| Example 2 | 400 | 120 | 20% Na₂SO₃ 45', 85° C. | 39 | 84 | 38 | 25 | 0.3 | <0.1 |
| Example 3 | 420 | 20 | 20% Na₂SO₃ 45', 85° C. | 42 | 91 | 43 | 28 | 0.3 | <0.1 |
| Example 4 | 380 | 240 | 20% Na₂SO₃ 45', 85° C. | 40 | 93 | 42 | 26 | 0.3 | 0.3 |
| Example 5 | 380 | 60 | 20% Na₂SO₃ 45', 85° C. | 39 | 90 | 41 | 25 | 0.3 | 0.8 |
| Comp. Exp. 1 | 300 | 80 | 13% Na₂SO₃ 45', 20° C. | 41 | 99 | 45 | 26 | 0.2 | 37.2 |
| Comp. Exp. 2 | 180 | 80 | 13% Na₂SO₃ 45', 20° C. | 44 | 80 | 46 | 27 | 0.2 | 81.2 |
| Comp. Exp. 3 | 380 | 60 | — | 38 | 91 | 49 | 25 | 0.0 | 538.4 |
| Comp. Exp. 4 | — | — | 20% Na₂SO₃ 45', 85° C. | 41 | 86 | 41 | 25 | 0.3 | 33.7 |
| Comp. Exp. 5 | 300 | 60 | 25% Na₂SO₃ 180', 95° C. | 41 | 86 | 41 | 25 | 0.3 | 33.7 |
| Comp. Exp. 6 | 180 | 80 | 10% Na₂SO₃ 45', 20° C. | 50 | 92 | 43 | 35 | 0.2 | 259.3 |

EXAMPLES B1 to B5

40 parts of each of the chromium dioxide samples stated in Table 1, 175 parts of a 13% strength solution of a thermoplastic polyesterurethane obtained from adipic acid, butane-1,4-diol and 4,4,-diisocyanatodiphenylmethane, in a mixture of equal amounts of tetrahydrofuran and dioxane, 150 parts of a 13% strength solution of a commercial polyvinylformal in a mixture of equal amounts of tetrahydrofuran and dioxane, 24 parts of a solvent mixture consisting of equal amounts of tetrahydrofuran and dioxane and 1 part of zinc stearate were mixed and were dispersed for 4 hours in a mill having a capacity of 500 parts by volume and containing 100 parts by volume of steel balls having a diameter of 1.5 mm. Thereafter, the same amounts of the two binder solutions, 13.5 parts of the stated solvent mixture and 0.1 part of a commercial silicone oil were once again added and dispersing was continued for a further 30 minutes. The dispersion was then filtered and was applied to a polyethylene terephthalate film using a conventional coating machine by means of a knife coater so that a dry layer 5.5 μm thick was obtained after drying and calendering. Directly after pouring of the liquid dispersion, the acicular chromium dioxide particles were oriented by means of a magnetic field along the recording direction. The magnetic properties measured on the tape samples, the stability of the tapes to temperature and humidity and the decrease in residual magnetization in percent are stated in Table 2.

COMPARATIVE EXAMPLES BV 1 TO 6

The chromium dioxide samples of Comparative Experiments 1 to 6 were processed under the same conditions as those described in Example B1. The magnetic properties measured on the tape samples, the stability of the tapes to temperature and humidity and the decrease in residual magnetization in percent are shown in Table 2.

TABLE 2

| | $M_r$ [mT] | $M_r$ (14) [mT] | Decrease in residual magnetization (%) |
|---|---|---|---|
| Example B1 | 163 | 162.7 | 0.3 |
| Example B2 | 145 | 145 | 0.0 |
| Example B3 | 145 | 145 | 0.0 |
| Example B4 | 151 | 149.3 | 1.1 |
| Example B5 | 146 | 145 | 0.8 |
| Comp. Exp. BV1 | 170 | 153 | 10 |
| Comp. Exp. BV2 | 180 | 159 | 11.8 |
| Comp. Exp. BV3 | 170 | 129 | 24 |
| Comp. Exp. BV4 | 148 | 133 | 9.8 |
| Comp. Exp. BV5 | 134 | 128 | 4.5 |
| Comp. Exp. BV6 | 152 | 121.6 | 20 |

We claim:

1. A chromium dioxide material consisting of acicular, ferromagnetic chromium dioxide particles having a nonmagnetic, hydrogen-containing protective surface layer, wherein the chromium dioxide material has a saturation magnetization greater than 80 nTm³/g and a Z 200 value of less than 0.85 ppm when both are measured in an external magnetic field of 380 kA/m.

2. A process for the preparation of a chromium dioxide material as claimed in claim 1, wherein chromium dioxide material formed in high pressure synthesis is first heated in air at from 360° to 420° C. for from 10 to 360 minutes, then suspended in from 5 to 15 parts by weight of water per part by weight of chromium dioxide, mixed with an aqueous solution of from 0.2 to 0.4 part by weight of sodium sulfite and treated at from 60° to 95° C. for not more than 180 minutes.

3. A magnetic recording medium comprising a nonmagnetic substrate material and a magnetizable layer based on chromium dioxide material finely distributed in a binder, wherein the chromium dioxide material has a saturation magnetization greater than 80 nTm³/g when measured in an external magnetic field of 380 kA/m wherein the residual magnetization of the magnetizable layer is not less than 145 mT and decreases by less than 1.5% in the course of 14 days in the environmental test when stored in air at 50° C. and 70% relative humidity.

* * * * *

UNITED STATES PATENT AND TRADEMARK OFFICE
CERTIFICATE OF CORRECTION

PATENT NO. : 5,096,779

DATED : March 17, 1992

INVENTOR(S) : Mueller et al.

It is certified that error appears in the above-identified patent and that said Letters Patent is hereby corrected as shown below:

ON THE TITLE PAGE

Immediately below "Filed: Aug. 23, 1989", insert --Foreign Application Priority Data Aug. 23, 1988 DE Fed. Rep. of Germany....3828498--

Signed and Sealed this

Twenty-first Day of September, 1993

Attest:

BRUCE LEHMAN

Attesting Officer

Commissioner of Patents and Trademarks